United States Patent
Huesges et al.

(10) Patent No.: US 9,239,031 B2
(45) Date of Patent: Jan. 19, 2016

(54) EXHAUST-GAS COOLING MODULE FOR AN INTERNAL COMBUSTION ENGINE

(75) Inventors: Hans-Juergen Huesges, Willich (DE); Hans-Ulrich Kuehnel, Moenchengladbach (DE)

(73) Assignee: PIERBURG GMBH, Neuss (DE)

( * ) Notice: Subject to any disclaimer, the term of this patent is extended or adjusted under 35 U.S.C. 154(b) by 443 days.

(21) Appl. No.: 13/637,652

(22) PCT Filed: Mar. 23, 2011

(86) PCT No.: PCT/EP2011/054460
§ 371 (c)(1),
(2), (4) Date: Sep. 27, 2012

(87) PCT Pub. No.: WO2011/128194
PCT Pub. Date: Oct. 20, 2011

(65) Prior Publication Data
US 2013/0025577 A1    Jan. 31, 2013

(30) Foreign Application Priority Data

Apr. 13, 2010    (DE) .......................... 10 2010 014 843

(51) Int. Cl.
F02M 25/07    (2006.01)

(52) U.S. Cl.
CPC ....... F02M 25/0792 (2013.01); F02M 25/0744 (2013.01); F02M 25/0751 (2013.01); *F02M 25/0707* (2013.01); *F02M 25/0737* (2013.01); *F02M 25/0754* (2013.01); *F02M 25/0795* (2013.01); *Y02T 10/121* (2013.01)

(58) Field of Classification Search
CPC ....... F02M 25/0707–25/0737; F02M 25/0792; F02M 25/0744; F02M 25/0751; F02M 25/0754; F02M 25/0795; Y02T 10/121

USPC ............. 123/568.12, 568.17, 568.18, 568.2, 123/568.21, 568.23, 568.24; 60/605.2

See application file for complete search history.

(56) References Cited

U.S. PATENT DOCUMENTS

| | | | | |
|---|---|---|---|---|
| 4,258,687 A | * | 3/1981 | Mauch et al. ............. | 123/568.12 |
| 4,267,812 A | * | 5/1981 | Aula et al. ................ | 123/568.12 |
| 6,213,105 B1 | * | 4/2001 | Banzhaf ............. | F02M 25/0703 |
| | | | | 123/568.12 |
| 6,269,870 B1 | * | 8/2001 | Banzhaf ................ | F01N 3/0205 |
| | | | | 165/158 |
| 6,295,815 B1 | * | 10/2001 | Bechle et al. ................ | 60/605.2 |
| 6,725,847 B2 | * | 4/2004 | Brunemann et al. ...... | 123/568.12 |
| 6,904,898 B1 | * | 6/2005 | Sahlen ...................... | 123/568.12 |
| 6,918,251 B2 | * | 7/2005 | Yanagisawa et al. ......... | 60/605.2 |

(Continued)

FOREIGN PATENT DOCUMENTS

| | | |
|---|---|---|
| DE | 197 34 801 A1 | 2/1999 |
| DE | 103 21 638 A1 | 1/2004 |

(Continued)

*Primary Examiner* — Stephen K Cronin
*Assistant Examiner* — Susan E Scharpf
(74) *Attorney, Agent, or Firm* — Norman B. Thot

(57) ABSTRACT

An exhaust gas cooling module for an internal combustion engine includes an exhaust gas recirculation valve comprising an exhaust gas recirculation valve housing having an inlet, an exhaust gas heat exchanger, an exhaust gas non-return valve comprising an exhaust gas non-return valve housing, and two exhaust gas channels. The two exhaust gas channels are arranged in the exhaust gas cooling module so as to separately extend from the inlet of the exhaust gas recirculation valve housing to the exhaust gas non-return valve housing via the exhaust gas heat exchanger.

8 Claims, 1 Drawing Sheet

(56) References Cited

U.S. PATENT DOCUMENTS

| | | | |
|---|---|---|---|
| 6,945,235 B1* | 9/2005 | Bertilsson et al. | 123/568.11 |
| 7,171,957 B2* | 2/2007 | Liu et al. | 123/568.12 |
| 7,757,677 B2* | 7/2010 | Dobrila | 123/568.11 |
| 2005/0098163 A1* | 5/2005 | Andoh et al. | 123/568.18 |
| 2008/0022677 A1 | 1/2008 | Barbe et al. | |
| 2009/0044789 A1* | 2/2009 | Eitel | F02M 25/0709 123/568.12 |
| 2010/0108041 A1 | 5/2010 | Gruner et al. | |
| 2010/0263610 A1* | 10/2010 | Mercz et al. | 123/41.09 |
| 2011/0168142 A1 | 7/2011 | Huelsmann | |

FOREIGN PATENT DOCUMENTS

| | | |
|---|---|---|
| DE | 10 2006 033 313 A1 | 3/2007 |
| DE | 10 2006 023 852 A1 | 11/2007 |
| DE | 10 2007 035 443 A1 | 1/2009 |
| DE | 10 2008 050 368 A1 | 4/2010 |
| WO | WO 2009/012897 A1 | 1/2009 |
| WO | WO 2009/047278 A1 | 4/2009 |

\* cited by examiner

EXHAUST-GAS COOLING MODULE FOR AN INTERNAL COMBUSTION ENGINE

CROSS REFERENCE TO PRIOR APPLICATIONS

This application is a U.S. National Phase application under 35 U.S.C. §371 of International Application No. PCT/EP2011/054460, filed on Mar. 23, 2011 and which claims benefit to German Patent Application No. 10 2010 014 843.1, filed on Apr. 13, 2010. The International Application was published in German on Oct. 20, 2011 as WO 2011/128194 A1 under PCT Article 21 (2).

FIELD

The present invention relates to an exhaust gas cooling module for an internal combustion engine, comprising an exhaust gas recirculation valve having an exhaust gas recirculation valve housing, an exhaust gas heat exchanger, and an exhaust gas non-return valve with an exhaust gas non-return valve housing.

BACKGROUND

Such exhaust gas cooling modules are known. For the reduction of pollutants, an exhaust gas flow is supplied to an exhaust gas cooler in a controlled manner. In order to reduce interfaces, which in the past have been established through hose or conduit connections between the individual aggregates, modules have been developed that were fastened to each other in a flow-conducting manner via simple flange connections. For example, the housing of an exhaust gas recirculation valve is directly connected with a heat exchanger. If applicable, bypass channels and bypass flaps were also integrated.

Such a module is described, for example, in WO 2009/047278 A1 wherein an exhaust gas cooler, an exhaust gas recirculation valve, a bypass flap with an actuator, as well as a vacuum container and a thermostat valve are fastened to a support element without requiring additional connection lines.

A cooling module is described in DE 10 2006 033 313 A1, wherein a non-return valve with two non-return flaps is arranged downstream of an exhaust gas heat exchanger that can be bypassed via a bypass channel, whereby a return flow of exhaust gas from the bypass channel into the cooling channel, and vice versa, is prevented.

The aforementioned exhaust gas recirculation systems are, however, only partially suitable for use in commercial vehicles that usually have an exhaust gas manifold with two separate exhaust gas flow passages which are often combined in the region of the exhaust gas recirculation at least in the region of the cooler. This leads to a substantial reduction in existing pressure pulsations. Since supercharged engines are additionally often used so that a high counter-pressure prevails in the region of exhaust gas introduction into the distribution rail, the pressure gradient is often insufficient to reliably provide a sufficient quantity of recirculated exhaust gas.

SUMMARY

An aspect of the present invention is to reduce emission values by means of an exhaust gas cooling module by reliably providing, as compared with known embodiments, a sufficient quantity of recirculated exhaust gas even when high counter-pressures prevail and exhaust gas cooling is given.

An additional aspect of the present invention is to realize as simple a structure as possible that has few interfaces.

In an embodiment, the present invention provides an exhaust gas cooling module for an internal combustion engine which includes an exhaust gas recirculation valve comprising an exhaust gas recirculation valve housing having an inlet, an exhaust gas heat exchanger, an exhaust gas non-return valve comprising an exhaust gas non-return valve housing, and two exhaust gas channels. The two exhaust gas channels are arranged in the exhaust gas cooling module so as to separately extend from the inlet of the exhaust gas recirculation valve housing to the exhaust gas non-return valve housing via the exhaust gas heat exchanger.

BRIEF DESCRIPTION OF THE DRAWINGS

The present invention is described in greater detail below on the basis of embodiments and of the drawings in which.

DETAILED DESCRIPTION

Figure 1:
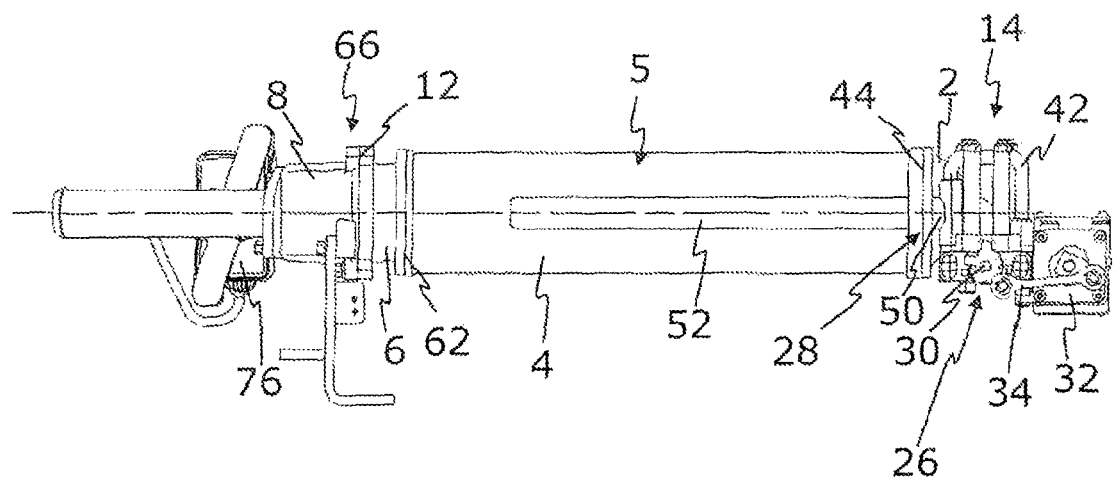
FIG. 1 shows a side elevational view of an exhaust gas cooling module of the present invention in top plan view.
Figure 2:
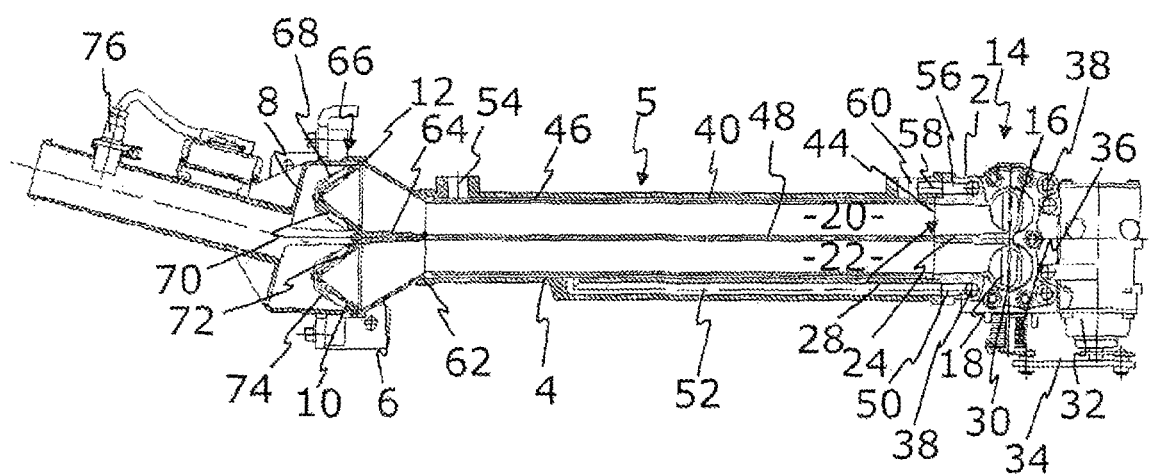
FIG. 2 shows a side elevational view of the present exhaust gas cooling module of FIG. 1 rotated by 90° and shown in section.

Because two exhaust gas channels are arranged in the exhaust gas cooling module that extend separately from the inlet of the exhaust gas recirculation valve housing to the exhaust gas non-return valve housing via the exhaust gas heat exchanger, the required exhaust gas quantity to be recirculated can be provided in a reliable manner even when a rather high counter-pressure prevails, since a complete separation of the exhaust gas flow passages of a commercial vehicle engine is provided up to behind the non-return valves. As a result, the existing pulsations are fully transmitted up to behind the non-return flaps so that the pulsations in the fluid flow, which are generated by the internal combustion engine in the respective cylinder rows and at the different times, are preserved, since a drastically reduced superposition of the pulsation waves occurs due to the separate guiding. The peaks of the pulsation waves are thus preserved and lead to a reliable opening of the non-return valves and thus to a reduction of pollutant emissions.

In an embodiment of the present invention, a respective exhaust gas recirculation flap can, for example, be arranged in both exhaust gas channels of the exhaust gas recirculation valve housing, by which a free flow cross section of the respective exhaust gas channel can be controlled. The use of flaps makes it possible to control larger flow cross sections. This arrangement also makes it possible to control both exhaust gas flow passages separately if two actuators were additionally used. This structure provides a separation of both exhaust gas flow passages also at the exhaust gas recirculation valve.

In an embodiment of the present invention, the exhaust gas heat exchanger can, for example, be fastened to the exhaust gas recirculation valve housing downstream of the exhaust gas recirculation valve housing and comprises a partition wall which separates the two exhaust gas channels from each other. The separation of the channels is thus continued in a simple manner without having to use two separate heat exchangers. The structure remains correspondingly simple.

In an embodiment of the present invention, a respective exhaust gas non-return flap can, for example, be arranged downstream of the exhaust gas heat exchanger in both exhaust gas channels separated from each other by a partition wall.

This measure provides for the separation of the exhaust gas flows up to a cross section in which a return flow of the exhaust gas is reliably prevented. The direct connection of the exhaust gas recirculation valve housing and the exhaust gas non-return valve housing with the heat exchanger results in reduced assembly effort, without having to use further intermediate elements and lines. The separation of the two flow passages is realized, during assembly, by the partition walls formed in the respective housings. In an embodiment of the present invention, an exhaust gas mass flow sensor can, for example, be arranged downstream of the non-return valve. A module is provided with which the engine control can be improved and, thereby, the emissions can be further reduced, since a direct exhaust gas quantity measurement is performed, whereas in known embodiments the exhaust gas quantity is typically calculated from other measured values in an error-prone manner. In this context, the position downstream of the non-return flaps is particularly advantageous since the pressure pulsations are there substantially reduced.

In an embodiment of the present invention, the exhaust gas cooling module can, for example, comprise a coolant channel extending in the exhaust gas recirculation valve housing and in the exhaust gas heat exchanger so that the exhaust gas recirculation valve housing serves as a pre-cooler and the actuator of the exhaust gas recirculation valve is subjected to less thermal stress or is decoupled thermally. A common channel moreover leads to a simpler assembly without any further connection lines.

In an embodiment of the present invention, a coolant flow in the coolant channel can, for example, be turned off by means of a coolant valve fastened to the coolant module. This valve makes it possible to turn off the coolant flow so as to achieve a faster heating of the internal combustion engine after a cold start, since, because of the absence of coolant circulation, the exhaust gas is recirculated to the cylinder substantially without being cooled. A quick heating of the standing coolant is also effected.

In an embodiment of the present invention, the exhaust gas recirculation flaps can, for example, be arranged on a shaft together and can be actuated by means of an actuator so that the exhaust gas flows of both flow passages are controlled using only one actuator. This reduces the assembly effort.

In an embodiment of the present invention, the two exhaust gas recirculation flaps can, for example, each be arranged on a shaft and the two shafts are actuable by means of two actuators. This allows a separated control of the exhaust gas recirculation quantity from both flow passages.

A cooling module is thus provided that is simple in structure and easy to assemble. A pre-assembly is also possible. The number of interfaces is minimized. This module is particularly suited for the recirculation of exhaust gas in internal combustion engines with high counter-pressure from the air intake side, since it is possible, even under these conditions, to return a sufficient exhaust gas quantity by using the pressure peaks of the exhaust gas flow passages.

The exhaust gas cooling module of the present invention and illustrated in the Figures is formed by a total of four outer housing parts, of which a first housing part is an exhaust gas recirculation valve housing 2, a second housing part is an outer housing 4 of an exhaust gas heat exchanger 5, a third housing part 6 forms the outlet of the exhaust gas heat exchanger 5, and a fourth housing part 8 serves as a manifold through which the exhaust gas is returned to the distribution rail. An exhaust gas non-return valve housing 10 is clamped and thereby fastened between the third housing part 6 and the fourth housing part 8 by means of a circumferential flange 12.

The exhaust gas recirculation valve housing 2 is the channel-forming housing of an exhaust gas recirculation valve 14 which, in the present embodiment, comprises two exhaust gas recirculation flaps 16, 18, each governing a respective flow cross section, each of the flow cross sections being assigned to a respective exhaust gas channel 20, 22. The first exhaust gas channel 20 is separated from the second exhaust gas channel 22 by a partition wall 24 formed in the exhaust gas recirculation valve housing 2. This partition wall 24 extends from the inlet 26 of the exhaust gas cooling module to the outlet 28 of the exhaust gas recirculation valve housing 2 that is arranged with an offset of 90° with respect to the inlet 26 so that an exhaust gas flow is also deflected by 90° inside the exhaust gas recirculation valve housing 2. The inlet 26 is in the form of a flange by which the module can be flanged directly to a non-illustrated engine block or an exhaust gas manifold, where two exhaust gas flow passages are formed separately in the engine block or exhaust gas manifold so that one exhaust gas flow passage is connected with the first exhaust gas channel 20 and the second exhaust gas flow passage is connected with the second exhaust gas flow passage 22.

The exhaust gas recirculation flaps 16, 18 are arranged on a common shaft 30 that is supported in the housing and can be rotated by means of an electromotive actuator 32 via a coupling linkage 34. Outside the exhaust gas recirculation valve housing 2, the shaft is surrounded by a return spring 36 by which, in the event of a failure of the electromotive actuator 32, the exhaust gas recirculation flaps 16, 18 are pivoted into their positions closing the two exhaust gas channels 20, 22.

Coolant channels 38 are additionally formed in the exhaust gas recirculation valve housing 2, by which the exhaust gas recirculation valve housing 2 that is exposed to high thermal stress is cooled and, in particular, the electromotive actuator 32 is protected from being thermally over-stressed. By these existing coolant channels 38, the exhaust gas recirculation valve housing 2 assumes the function of a pre-cooler. In order to obtain a cooling path of maximum length, despite the 90° deflection, which can be connected with a coolant channel 40 of the exhaust gas heat exchanger 5, configured as a coolant jacket, coolant pipes 42 are arranged at the exhaust gas recirculation valve housing 2, which allow the coolant to flow from the side of the outlet 28 to the side opposite the exhaust gas recirculation flaps 16, 18 and back to the outlet 28, without having to incur the high costs of forming such a deflection in the exhaust gas recirculation valve housing 2 itself.

The exhaust gas recirculation valve housing 2 is fastened to the exhaust gas heat exchanger 5 through a flange connection 44, for example, with interposition of a sealing (not shown). Besides the outer housing 4 mentioned before, the exhaust gas heat exchanger 5 has an inner housing 46 with a partition wall 48 arranged in extension of the partition wall 24 of the exhaust gas recirculation valve housing 2 so that a separation of the two exhaust gas channels 20, 22 is also continued in the exhaust gas heat exchanger 5. The flange connection also provides for the fluidic connection between the coolant channels 38 of the exhaust gas recirculation valve housing 2 and the coolant channel 40 of the exhaust gas heat exchanger 5.

To make the coolant actually flow in the exhaust gas recirculation valve housing 2, a differential pressure is provided by connecting a coolant inlet 50 into the exhaust gas recirculation valve housing 2 with a connection channel 52 that opens in the vicinity of an inflow 54 into the coolant channel 40, and by connecting a coolant outlet 56 from the exhaust gas recirculation valve housing 2 with an outflow 60 of the coolant channel 40 of the exhaust gas heat exchanger 5 via a connection channel 58. The two connection channels 52, 58 are formed separately in the outer housing 4 of the exhaust gas heat exchanger 5. The coolant channel 40 designed as a coolant jacket is arranged between the inner housing 46 and the outer housing 4 of the exhaust gas heat exchanger 5, and thus surrounds the exhaust gas channels 20, 22 carrying the exhaust gas.

On the side of the exhaust gas heat exchanger 5 opposite the exhaust gas recirculation valve housing 2, the third housing part 6 forming the outlet of the exhaust gas heat exchanger 5 is also fastened by means of a flange connection 62. This third housing part 6 also comprises a partition wall 64 by which the partition wall 48 of the exhaust gas heat exchanger 5 is extended so that a separation of the two exhaust gas channels 20, 22 is continued.

An exhaust gas non-return valve 66 is arranged downstream of the third housing part 6, which valve, in the present embodiment, comprises a total of four exhaust gas non-return flaps 68, 70, 72, 74. The exhaust gas non-return flaps 68, 70, 72, 74 are arranged in pairs opposite each other so that the flaps 68, 70 close or open the exhaust gas channel 20, and the flaps 72, 74 close or open the separate exhaust gas channel 22. The exhaust gas non-return flaps 68, 70, 72, 74 are formed by leaf springs which are clamped in the exhaust gas non-return valve housing 10 on their side closer to the third housing part 6 and extend obliquely in the direction of the fourth housing part 8, where they rest on the exhaust gas non-return valve housing 10 by their opposite side. In the normal state, each of the exhaust gas non-return flaps 68, 70, 72, 74 closes a window in the exhaust gas non-return valve housing 10. As soon as the pressure on the side of the exhaust gas non-return flaps 68, 70, 72, 74 facing to the third housing part 6 becomes higher than on the opposite side, the exhaust gas non-return flaps 68, 70, 72, 74 are lifted from the valve seat and clear and open. In this state, exhaust gas can accordingly flow from the exhaust gas non-return valve housing 10 into the fourth housing part 8 adjoining the same in the downstream direction. This fourth housing part 8, in which the two exhaust gas flows of the exhaust-gas flow passages are combined for the first time, thereafter narrows to an exhaust-gas pipe in which an exhaust gas mass flow sensor 76 is arranged.

When exhaust gas from both exhaust gas flow passages flows into the exhaust gas channels 20, 22, the two exhaust gas flows are first cooled in the exhaust-gas recirculation valve housing 2 and, by means of the opening width of the flow cross section, the quantity is adjusted at the electromotive actuator 32 according to a control command, using the exhaust gas recirculation flaps 16, 18. The exhaust gas flowing on is further cooled separately in the exhaust gas heat exchanger 5 and reaches the exhaust gas non-return flaps 68, 70, 72, 74. Since the two exhaust gas flows do not mix with each other along the cooling module, the two gas flows at this moment still show the pulsations of the discharge from the cylinder rows of the internal combustion engine, since the intervals between the individual pulses are doubled as compared to a combined exhaust gas train, whereby interferences are drastically reduced. This, however, leads to pressure peaks that still cause an opening of the exhaust gas non-return flaps 68, 70, 72, 74 of the respective exhaust gas channel 20, 22 despite a prevailing high counter-pressure in the region of the fourth housing part 8.

It is thereby provided that sufficient exhaust gas quantities for a reduction of pollutants can be returned which may otherwise be difficult with large-volume supercharged engines. This exhaust gas is made available as cooled exhaust gas to the distribution rail and thus to the internal combustion engine, which again serves to reduce pollutants.

An additional reduction of pollutants can be achieved by arranging a non-illustrated coolant valve within the coolant channel 40 or in the inflow or the outflow of the coolant channel 40, by which valve the flow cross section of the coolant channel 38, 40 can be interrupted. The warm-up phase of the internal combustion engine, during which most pollutants are produced, can thereby be shortened, since no coolant circulates and, thus, the exhaust gas is returned to the distribution rail substantially without cooling.

Various modifications with respect to the embodiments described are possible that fall within the scope of protection of the claims. The present invention is therefore not limited to embodiments described herein; reference should also be had to the appended claims

What is claimed is:

1. An exhaust gas cooling module for an internal combustion engine, the exhaust gas cooling module comprising:
    an exhaust gas recirculation valve comprising an exhaust gas recirculation valve housing having an inlet;
    an actuator;
    an exhaust gas heat exchanger;
    an exhaust gas non-return valve comprising an exhaust gas non-return valve housing;
    two exhaust gas channels;
    a first coolant channel arranged in the exhaust gas recirculation valve housing; and
    a second coolant channel arranged in the exhaust gas heat exchanger,
    wherein,
    the first coolant channel is fluidically connected to the second coolant channel,
    the first coolant channel and the second coolant channel are configured to cool the exhaust gas recirculation valve housing so as to thermally decouple the actuator or to reduce a thermal stress on the actuator, and
    the two exhaust gas channels are arranged in the exhaust gas cooling module so as to separately extend from the inlet of the exhaust gas recirculation valve housing to the exhaust gas non-return valve housing via the exhaust gas heat exchanger.

2. The exhaust gas cooling module as recited in claim 1, further comprising exhaust gas recirculation flaps, wherein a respective exhaust gas recirculation flap is arranged in each of the two exhaust gas channels in the exhaust gas recirculation valve housing, the exhaust gas recirculation flaps being configured to control a free flow cross section of each of the two exhaust gas channels.

3. The exhaust gas cooling module as recited in claim 2, further comprising a shaft, wherein the exhaust gas recirculation flaps are arranged on the shaft, and wherein the actuator is configured to actuate the exhaust gas recirculation flaps.

4. The exhaust gas cooling module as recited in claim 2, further comprising two shafts and two actuators, wherein the exhaust gas recirculation flaps are two exhaust gas recirculation flaps, wherein each of the two exhaust gas recirculation flaps are arranged on a respective shaft, and wherein each of the two respective actuators is configured to actuate a respective shaft.

5. The exhaust gas cooling module as recited in claim 1, wherein the exhaust gas heat exchanger comprises a partition wall configured to separate the two exhaust gas channels, and wherein the exhaust gas heat exchanger is fastened to the exhaust gas recirculation valve housing downstream of the exhaust gas recirculation valve housing.

6. The exhaust gas cooling module as recited in claim 1, further comprising at least one exhaust gas non-return flap arranged in each of the two exhaust gas channels.

7. The exhaust gas cooling module as recited in claim 1, further comprising an exhaust gas mass flow sensor arranged downstream of the exhaust gas non-return valve.

8. The exhaust gas cooling module as recited in claim 1, further comprising a coolant valve fastened to the exhaust gas cooling module, the coolant valve being configured to turn off a coolant flow in the coolant channel.

\* \* \* \* \*